J. J. VINTON.
HARROW.
No. 190,102.                    Patented April 24, 1877.
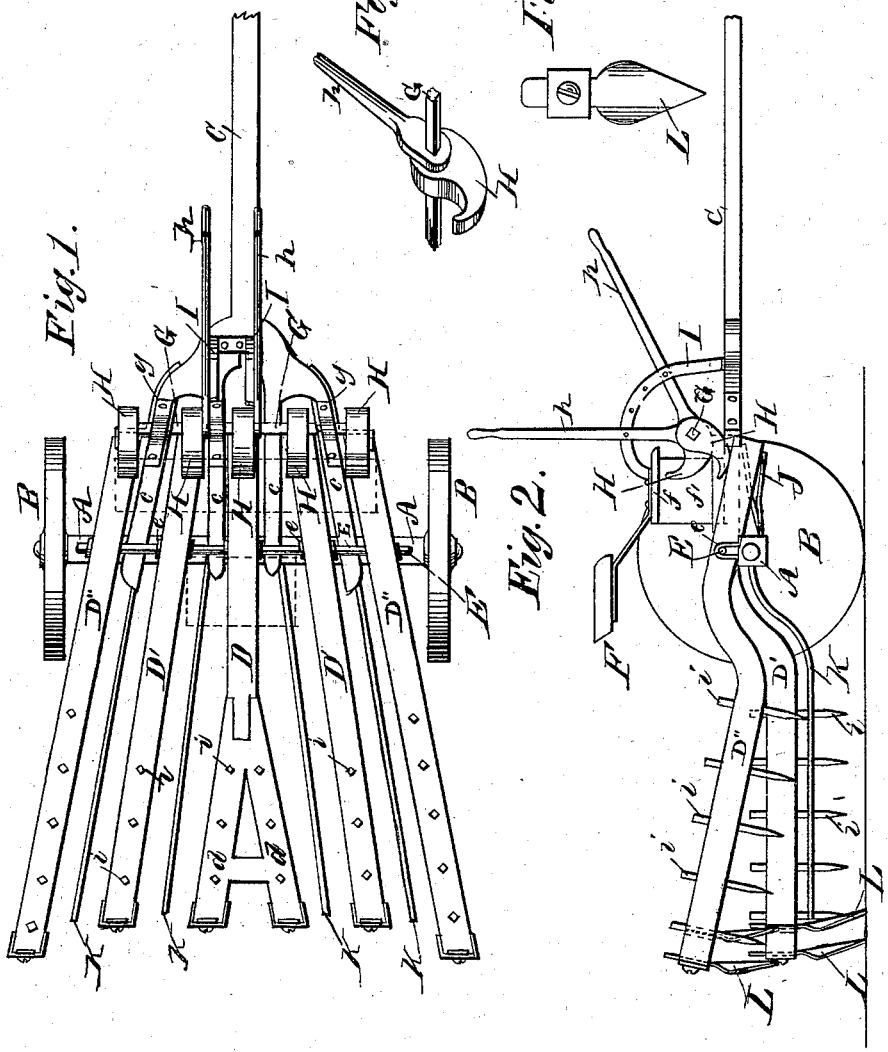

UNITED STATES PATENT OFFICE.

JOHN J. VINTON, OF SHARON, PENNSYLVANIA.

IMPROVEMENT IN HARROWS.

Specification forming part of Letters Patent No. 190,102, dated April 24, 1877; application filed February 28, 1877.

*To all whom it may concern:*

Be it known that I, JOHN J. VINTON, of Sharon, in the county of Mercer and State of Pennsylvania, have invented certain new and useful Improvements in Harrows; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to harrows, more particularly to that class known as "sulky-harrows," which are mounted on a truck-frame or axle and wheels, and provided with a draft-pole, and seat for the driver.

The invention consists in certain new and improved devices and combination of devices by means of which the operation of harrowing is accomplished with much greater ease and comfort to the operator, and more thoroughly and effectually, than with the machines heretofore in use, as hereinafter more fully set forth.

In the accompanying drawings, Figure 1 is a plan view of my improved harrow with the driver's seat and platform removed. Fig. 2 is a side elevation of the same. Fig. 3 is a detached view of one of the cam-levers for adjusting and elevating the harrow frames or bars, and Fig. 4 is a detached view of one of the detachable shovels or teeth employed for ridging the land after the seed is sown and harrowed.

Referring to the parts by letters, A represents an axle, and B B two supporting-wheels. C is the tongue or draft-pole, the rear end of which is secured to the axle by means of four branching bars or hounds, c. D D' D'' represent the harrow frames or bars; the rear end of the central one, D, is triangular in form, or with two diverging branches, d d. The other frames are made of single bars, the two outer ones, D'', being slightly longer than the others.

The forward ends of these harrow frames or bars are bent or turned upward, and project forward of the axle A, to which they are pivoted by means of a shaft or rod, E, which is secured to the axle by means of staples or eyebolts e.

F is the driver's seat, and f the foot-rest or platform for the support of the driver's feet, both the seat and platform being mounted over and above the axle upon posts or uprights f', secured to the two outer hounds of the tongue.

On the hounds, in front of the platform f, are blocks, which, with suitable cap-pieces g, form journal-bearings for a shaft or shafts, G, to which shafts are keyed cam-levers H, having handles h. There is one of these cams H for each of the harrow frames or bars, and the bars and cams are so arranged relatively to each other that the latter operate upon the forward ends of the bars, as hereinafter more fully set forth, and the cams may, if desired, each have an independent shaft and operating-handle; or they may be arranged in couplets or triplets, as found most desirable and convenient. Segmental rack-bars I may also be used in connection with the lever-handles h, for the purpose of holding the harrow-beams in any desired position.

J represents a spring or springs, secured at one end to the axle A, and projecting forward therefrom. These springs operate as elastic or yielding stops, to prevent the harrow-frames or their rear ends rising too high during the operation of the machine.

K represents rods or bars, the forward ends of which are bent upward, in form corresponding with the form of the harrow-beams and secured to the axle. They are arranged in the spaces intermediate between the harrow frames or beams, as clearly shown in Fig. 1 of the drawings.

It will also be seen, by an inspection of said Fig. 1, that the harrow-frames are arranged radially, diverging at their rear ends. They are also provided with harrow-teeth i, of usual construction.

L represents the furrow-openers or shovels, removably attached to the ends of the harrow-beams, for the purpose hereinafter set forth.

The operation of the machine is as follows: When used for fining or pulverizing the soil, or for harrowing in the grain, the shovels L are removed from the bars, and the lever handle or handles h are depressed. In passing over the field in the operation of harrowing, the harrow-frames will have a free and independent vertical movement sufficient for practical operation, but limited by the spring-stops J, which keep them in proper working position. As each bar or frame is independently pivoted, it will rise and fall without affecting the others, thereby insuring an even and steady motion of the machine, preventing the teeth of any one frame being thrown out of the ground through the operation of the other. Should it be necessary to raise a portion of the harrow-frames above the ground, so as to clear an obstruction, or for other cause, the operator elevates the lever for operating the same, thereby causing its cam H to impinge upon the forward end of the harrow-bar, so as to depress it and raise the rear end, and thereby bring its teeth out of the ground. For convenience in turning at the end of the row, all the harrow-frames may be elevated in this way, and when the machine is turned it may be backed up to the edge of the field, then lowered and again put in operation, so that no part of the field need be left unharrowed with a machine of this description. It will also be evident that by elevating all the harrows and securing them in this elevated position the machine may be driven from field to field or along the road with the greatest facility.

Should the harrow-teeth get choked up with weeds or trash during the operation of the machine, they may be at once cleared by raising the frames in the same manner, the rods K, interposed between the frames or bars, accomplishing this result by stripping and cleaning the teeth, and this operation, it will be seen, can be performed without requiring to stop the machine.

After a field has been sown with grain and properly harrowed, it is found advantageous to form furrows and ridges like those left by the drilling-machine, the ridges protecting the young grain, and the furrows aiding in carrying off the surface-water. This result can be accomplished with my machine by attaching the shovels or furrow-openers L to the ends of the beams, and again passing the machine over the field.

Having thus described my invention, what I claim as new, and desire to secure by Letters Patent, is—

1. The rearwardly-diverging harrow frames or bars D D' D'', each being independently pivoted to the axle A, so as to have a free vertical and independent motion, as and for the purpose described.

2. The independently-pivoted harrow frames or bars D D' D'', operating in combination with the cam-levers H, axle A, and wheels B, substantially as and for the purpose specified.

3. In combination with the axle A and wheels B, and with the pivoted harrow-frames having independent motion, as described, the cam-levers H and rods or bars K, operating substantially as and for the purpose specified.

In testimony that I claim the foregoing as my own I affix my signature in presence of two witnesses.

JOHN J. VINTON.

Witnesses:
   D. G. STUART,
   A. McCALLUM.